United States Patent
Tarissan (10) Patent No.: US 10,865,929 B2
(45) Date of Patent: Dec. 15, 2020

(54) CONNECTION DEVICE AND METHOD

(71) Applicant: Parker Hannifin Manufacturing France, Ville-la-Grand (FR)

(72) Inventor: Fabrice Tarissan, Villaz (FR)

(73) Assignee: Parker Hannifin Manufacturing France, Ville-la-Grand (FR)

(*) Notice: Subject to any disclaimer, the term of this patent is extended or adjusted under 35 U.S.C. 154(b) by 167 days.

(21) Appl. No.: 16/074,809

(22) PCT Filed: Feb. 3, 2017

(86) PCT No.: PCT/FR2017/050256
§ 371 (c)(1),
(2) Date: Nov. 21, 2018

(87) PCT Pub. No.: WO2017/134406
PCT Pub. Date: Aug. 10, 2017

(65) Prior Publication Data
US 2019/0086015 A1  Mar. 21, 2019

(30) Foreign Application Priority Data

Feb. 3, 2016 (FR) .................................. 16 50838

(51) Int. Cl.
| | | |
|---|---|---|
| *F16L 37/36* | (2006.01) | |
| *F16L 29/00* | (2006.01) | |
| *F16L 37/23* | (2006.01) | |

(52) U.S. Cl.
CPC ............. *F16L 37/36* (2013.01); *F16L 29/007* (2013.01); *F16L 37/23* (2013.01)

(58) Field of Classification Search
CPC ......... F16L 37/36; F16L 37/367; F16L 37/34; F16L 29/007; F16L 37/22; F16L 37/23
See application file for complete search history.

(56) References Cited

U.S. PATENT DOCUMENTS 2,203,922 A * 6/1940 Paisley ................... F16L 37/36
137/614.06
2,372,820 A * 4/1945 Gardes ................... F16L 29/007
137/269
(Continued)

FOREIGN PATENT DOCUMENTS

| JP | 2009-097714 | 1/1997 |
| WO | 2004005786 | 1/2004 |

OTHER PUBLICATIONS

International Search Report and Written Opinion for corresponding Patent Application No. PCT/FR2017/050256 dated May 17, 2017.
(Continued)

*Primary Examiner* — David Colon-Morales
(74) *Attorney, Agent, or Firm* — Renner, Otto, Boisselle & Sklar LLP (57) ABSTRACT

A device including a first connector and a second connector. The first connector and the second connector include a stationary body defining a fluid circulation conduit opening up into a connection opening, and a valve that is movable in relation to the stationary body, between a closing position in which the valve closes the connection opening, and a release position in which the valve opens up a passage through the connection opening. The device also comprises a first locking arrangement designed to lock the movable valve of the first connector to the stationary body of the second connector and second locking arrangement designed to lock the stationary body of the first connector to the movable valve of the second connector.

10 Claims, 10 Drawing Sheets

(56) References Cited

U.S. PATENT DOCUMENTS

| | | | |
|---|---|---|---|
| 2,799,517 A | | 2/1955 | Bert |
| 2,714,518 A | * | 8/1955 | Balass ................... F16L 37/367 |
| | | | 137/614.03 |
| 2,758,611 A | * | 8/1956 | Michaels ................ F16L 37/36 |
| | | | 137/614 |
| 4,271,865 A | * | 6/1981 | Galloway ............. F16L 37/101 |
| | | | 137/614.06 |
| 4,921,013 A | * | 5/1990 | Spalink ................... F16L 37/30 |
| | | | 137/614.01 |
| 4,924,909 A | * | 5/1990 | Wilcox ................... F16L 37/34 |
| | | | 137/614.03 |
| 5,325,890 A | * | 7/1994 | Wilkins ................. F16L 37/30 |
| | | | 137/614.03 |
| 5,483,993 A | | 1/1996 | Roebelen, Jr. |
| 2004/0074541 A1 | * | 4/2004 | Sharpe ............... H05K 7/20272 |
| | | | 137/614.04 |
| 2014/0182721 A1 | * | 7/2014 | Rowe .................... F16L 37/367 |
| | | | 137/614.2 |

OTHER PUBLICATIONS

Notice of Reasons of Refusal for corresponding Japanese patent application No. 2018-541175 dated Jul. 20, 2020.

* cited by examiner

CONNECTION DEVICE AND METHOD

The present invention relates to a connection device, as well as a method of connecting the connectors of the said connection device.

BACKGROUND

Traditional connection devices comprise a female connector, and a male connector intended to be engaged with the female connector in order to establish a fluid communication between the male connector and the female connector.

Conventionally, the male and female connectors each comprise a stationary body defining a conduit enabling the flow of a liquid and opening into an inlet/outlet orifice, and a gate valve movable relative to the stationary body between a closing position in which the movable valve closes the inlet/outlet orifice and a release position in which the movable valve allows the flow of a liquid through the inlet/outlet orifice. Traditionally, a spring is used to return each valve to the closing position.

A disadvantage of existing connection devices is the difficulty of connecting the two connectors, male and female, while a fluid is under pressure in the conduit of one and/or the other of the two connectors.

Another disadvantage is the presence in the conduits of connectors of elements that can obstruct or limit the flow of the fluid once the two connectors are connected. This can cause an obstruction of the conduits in which the fluid circulates when this fluid contains solid elements, which for example is the case of partially frozen water, used particularly as cooling liquid.

Furthermore, the seals used in these connection devices to prevent fluid leaks are placed in the flow of fluid circulating between the two connectors. This can hinder the flow of the fluid, and in the event of a high fluid flow rate, there is a risk the seals will be pulled off.

An additional disadvantage is that sometimes, during disconnection, one or more valves is blocked in the release position, the spring being too weak to ensure the return of the valves to the closing position.

Known from the document U.S. Pat. No. 5,483,993 is a coupler comprising a male part and a female part intended to be connected in order to establish between them a fluid communication for zero- or low-gravity applications. However, this coupler has a complex architecture that does not enable a foolproof repositioning of the valves upon disconnection, and there is a risk of leakage in the case of fluid under pressure.

SUMMARY OF THE INVENTION

Also, the present invention seeks to remedy all or part of these disadvantages by proposing a connection device offering the possibility of achieving a connection under pressure without risk of leakage and without limitation of flow rate of the fluid.

To that end, an object of the present invention is a connection device comprising a first connector and a second connector, the first connector and the second connector comprising a stationary body, the stationary body defining a fluid circulation conduit that opens into a connection opening, and a valve movable relative to the stationary body between a closing position, in which the valve closes the connection opening, and a release position, in which the valve opens a passage through the connection opening, wherein the connection device further comprises first locking means configured to lock the movable valve of the first connector to the stationary body of the second connector, and second locking means configured to lock the stationary body of the first connector to the movable valve of the second connector.

Thus, the connection device according to the invention enables a connection of the movable valve of each connector to the stationary part of the other connector.

This dual connection, movable parts to stationary parts, prevents disengagement, a separation between the valves and the respective stationary bodies under the effect of the pressure of the fluid at the time of connection.

Thus, the device according to the invention allows a connection under pressure.

According to a preferred embodiment, the connection device comprises locking means configured to maintain the movable valve of the first connector and the stationary part of the second connector in a locked position, as well as the stationary part of the first connector and the movable valve of the second connector, while the valves are not in their closing position.

Thus, during disconnection, the valves are pulled from the release position to the closing position by the stationary body of the connector to which the said valves are respectively maintained locked.

This makes it possible to achieve a disconnection while the fluid under pressure still circulates between the first and second connectors.

This also makes it possible to avoid blockage of the valves in the release position, for example due to jamming.

According to a preferred embodiment, the valves are movable in translation relative to the stationary bodies along an axis of translation substantially perpendicular to a normal to the connection openings.

The pressure is therefore perpendicular to the direction of movement of the valves. The pressure of the fluid therefore has no effect on the opening or closing of the valves, which allows an effortless connection under pressure.

According to a preferred embodiment, at least one of the connectors between the first connector and the second connector comprises two sealing members intended to prevent leakage of fluid between the stationary body and the valve of the said connector when the valve is in the closing position, both sealing members being supported by the same part of the said connector.

Thus, the pressure is exerted on two sealing members pertaining to the same part, which makes it possible to achieve a connection under pressure.

Otherwise, the pressure could create a separation between the sealing members, and therefore result in leaks.

It will be noted that each of the first and second connectors preferably includes the said two sealing members supported by the same part of each of the connectors.

According to a preferred embodiment, at least one of the connectors between the first connector and the second connector comprises two sealing members intended to prevent a leak of fluid between the stationary body and the valve of the said connector when the valve is in the closing position, the two sealing members being arranged outside the conduit defined by the stationary body of the said connector.

Thus, the sealing means are protected; this prevents the sealing means from being pulled out under the effect of the fluid pressure or a high flow rate.

It will be noted that each of the first and second connectors preferably includes the said two sealing members arranged outside the conduit defined by the stationary body of each of the connectors.

According to a preferred embodiment, the fluid circulation conduit of the first and second connector defines an open passage cross-section.

In other words, the fluid circulation conduit is free of any obstacle.

Thus, there is no drop in pressure between the first and the second connector. Moreover, this prevents a blockage of the conduits when the fluid circulating through the connectors contains solid elements, as for example water containing crushed ice.

According to a preferred embodiment, the connection device comprises means of regulating the flow rate of fluid intended to circulate through the first and second connectors.

According to a preferred embodiment, the connection device comprises means of automatic connection of the first and second connectors.

According to a preferred embodiment, the connection device comprises a locking system configured to lock the first connector and the second connector once they are connected, the said locking system being different from the first and second locking means.

Thus, this characteristic makes it possible to distinguish the function of maintaining the first and second connectors in a connected state from that of securing the valves on the stationary bodies. It is therefore possible to use a single locking system while the first and second connectors each comprise a plurality of conduits and valves (multi-coupler). It is also possible to vary a cross-section of fluid passage while the first and second connectors are locked in a connected state.

According to a preferred embodiment, the connection device has no means of locking valves in the closing position.

This characteristic, made possible by the equalization of pressure exerted on the valves, makes it possible to have a simpler structure.

According to a preferred embodiment, the first and second connectors comprise return means for returning each valve to the closing position.

Thus, the return of the valves to the closing position is automatic and requires no action or control by a user other than the disconnection of the first and second connectors.

According to another aspect, the invention also concerns a first connector intended to implement the connection device having the aforementioned characteristics, the first connector comprising a stationary body, a fluid circulation conduit defined by the stationary body, a connection opening into which the fluid circulation conduit opens, and a valve movable relative to the stationary body between a closing position in which the valve closes the connection opening and a release position in which the valve opens a passage through the connection opening, wherein the valve comprises a first locking element for securing the valve to the stationary body of the second connector of the connection device having the aforementioned characteristics, and wherein the stationary body comprises a second locking element for securing the stationary body to the valve of the second connector.

The said connector, which enables a connection under pressure, can further comprise all or part of the characteristics described above of the first connector of the connection device according to the invention.

According to another aspect, the invention also concerns a second connector intended to implement the connection device having the aforementioned characteristics, the second connector comprising a stationary body, a fluid circulation conduit defined by the stationary body, a connection opening into which the fluid circulation conduit opens, and a valve movable relative to the stationary body between a closing position in which the valve closes the connection opening and a release position in which the valve opens a passage through the connection opening, wherein the stationary body comprises a first locking element for securing the stationary body to the valve of the first connector of the connection device having the aforementioned characteristics, and wherein the valve comprises a second locking element for securing the valve to the stationary body of the first connector.

The said connector, which enables connection under pressure, can further comprise all or part of the previously described characteristics of the second connector of the connection device according to the invention.

According to another aspect, an object of the invention is a method of connection of a first connector and a second connector of a connection device having the aforementioned characteristics, comprising a first locking step enabling the locking of the valve of each connector between the first and second connectors to the stationary body of the other connector of the said first and second connectors, then a second locking step, different from the first locking step, enabling the locking of the first connector to the second connector.

Thus, the said method first offers a locking of the valves to the stationary body of the other connector, then a direct locking of the connectors to each other, particularly of a support of the first connector to a support of the second connector, in order to maintain the first and second connectors in a connected state. This sequencing makes it possible to avoid the valves being moved in an uncontrolled manner under the effect of the pressure of the fluid.

BRIEF DESCRIPTION OF THE DRAWINGS

Other characteristics and advantages of the present invention will be seen clearly from the following detailed description of one embodiment provided by way of non-limiting example, with reference to the appended drawings in which.

DETAILED DESCRIPTION

Figure 1:
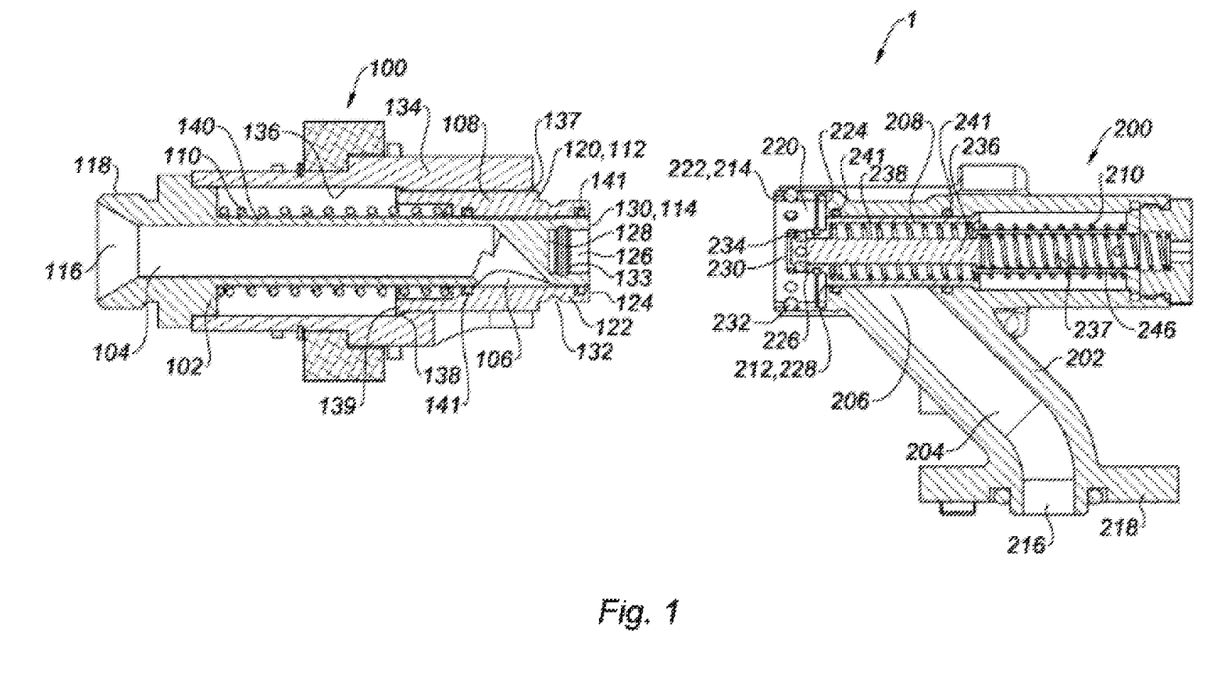
FIG. 1 is a cross-sectional side view of a connection device according to one embodiment of the invention, the first and second connector being disconnected, separated from each other.

FIG. 1 shows a connection device 1 according to one embodiment of the invention. The connection device 1 comprises a first connector 100, for example the female connector, and a second connector 200, for example a male connector. The connection device 1 is intended to establish fluid communication between two external devices (not shown), by connection of the first connector 100, connected to one of the two external devices, and of the second connector 200, connected to the other of the two external devices.

The first and the second connectors 100, 200 comprise a stationary body 102, 202, a fluid circulation conduit 104, 204 delimited by the stationary body 102, 202, a connection opening 106, 206 into which the conduit 104, 204 opens, and a valve 108, 208 that is movable particularly in translation relative to the stationary body 102, 202 between a closing position (which can be seen for example in FIGS. 1 and 8) in which the valve 108, 208 closes the connection opening 106, 206, and a release position (FIG. 7) in which the valve 108, 208 opens a passage through the connection opening 106, 206 to allow the flow of a fluid between the two connectors 100, 200 via the connection openings 106, 206 and the conduits 104, 204.

The first and second connectors 100, 200 can comprise return means, and preferably only return means, such as a spring 110, 210, to return the valve 108, 208 to the closing position. Thus, the return of the valves 108, 208 to the closing position is automatic. The spring 110 advantageously extends around the part of the stationary body 102 delimiting the conduit 104.

It will be noted that the conduit 104, 204 delimited by the stationary body 102, 202 of each of the first and second connectors 100, 200 is open, free, with no obstacle that can hinder the circulation of the fluid, particularly if the fluid includes solid elements, for example water mixed with crushed ice used as cooling liquid. In particular, it will be noted that the cross-section of the passage of the fluid in the interior of the conduits 104, 204 is substantially constant, i.e. the cross-section transverse to the conduit 104, 204 has a substantially constant area.

The connection opening 106, 206 extends in this case to one end of the conduit 104, 204, the other end opening in this case into a connection opening 116, 216 intended to communicate with the external device and arranged for that purpose at a connection portion 118, 218 making it possible to connect the connectors 100, 200 to the external devices to be coupled.

It will be noted that the first and second connectors 100, 200 are advantageously configured to interlock in order to be connected. Such interlocking is intended to cause the movement of the valves 108, 208 from the closing position to the release position and to align the openings 106, 206, i.e. to place them substantially facing each other in order to enable the circulation of a fluid between the connectors 100, 200 through the conduits 104, 204 and the openings 106, 206.

More particularly, the stationary body 202 of the second connector 200 is intended to push back the valve 108 of the first connector 100 to the release position during the connection of the first connector 100 and the second connector 200. Similarly, the stationary body 102 of the first connector 100 is intended to push back the valve 208 of the second connector 200 to the release position during said connection.

As illustrated for example in FIG. 1, the valve 108 of the first connector thus comprises an abutment face 112, and the stationary body 202 of the second connector 200 comprises a bearing face 214 intended to press against the abutment face 112 during the connection, in order to cause the movement of the valve 108 from the closing position to the release position.

Similarly, the valve 208 of the second connector comprises an abutment face 212, and the stationary body 102 of the first connector 100 comprises a bearing face 114 intended to press against the abutment face 212 during the connection, in order to cause the movement of the valve 208 from the closing position to the release position.

More specifically, according to the example of FIG. 1, the valve 108 of the first connector 100 can be a ring, substantially cylindrical, having a shoulder 120 from which a stub portion 122 extends having an end wall 124 and intended to engage in a recess 220 made at one end of the stationary body 202 of the second connector 200, the said recess 220 having an upper edge 222 defining an opening and a shoulder 224 forming the bottom of the recess 220. The shoulder 120 and the upper edge 222 are intended to press against each other during the connection of the connectors 100, 200. Alternatively, or in addition, the end wall 124 and the bottom 224 can also press against each other during the connection of the connectors 100, 200. Thus, the abutment face 112 is for example defined by the shoulder 120 and the bearing face 214 by the upper edge 222.

The stationary body 102 of the first connector 100 can have a substantially cylindrical shape and have, particularly at one end, a recess 126 suitable for receiving a stub portion 226 situated at one end of the valve 208, extending from a shoulder 228 of the valve 208 and having an end wall 230. The recess 126 has a bottom 128 and an upper edge 130 defining an opening. The end wall 230 and the bottom 128 are intended to press together when the first connector 100 and the second connector 200 are engaged. Alternatively, or in addition, the shoulder 228 and the upper edge 130 can be intended to press together when the connectors 100, 200 are connected. Thus, the abutment face 212 can be defined for example by the shoulder 228, and the bearing face 114 by the upper edge 130.

Figure 9:
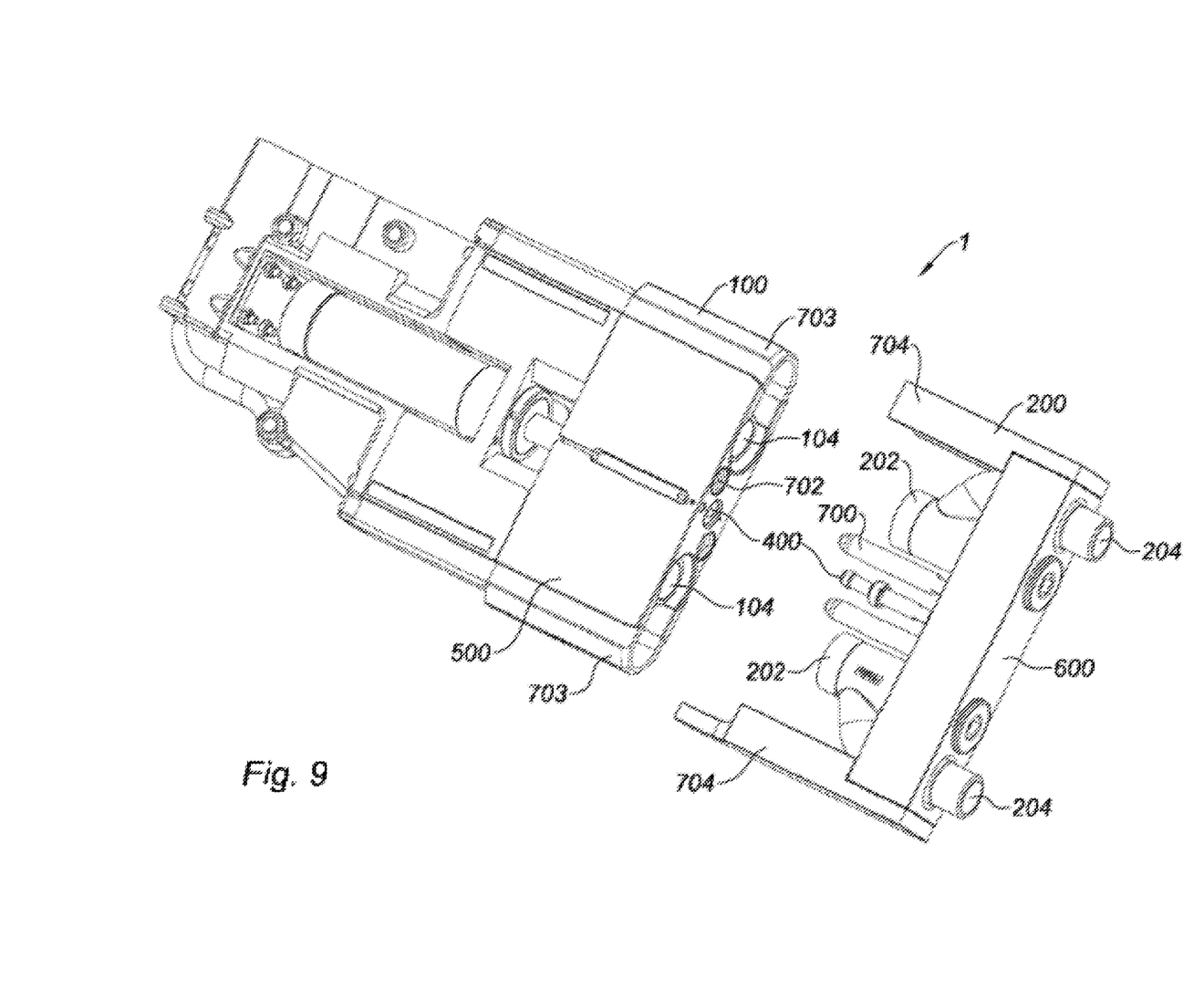
FIGS. 9 and 10 are perspective views of a connection device according to one embodiment of the invention, respectively in a disconnected and connected state.

The connection device 1 can comprise a locking system 400, which can be seen in FIG. 9, enabling the first connector 100 to be locked to the second connector 200 once the engagement of the said connectors 100, 200 is completed, i.e. once the connection openings 106, 206 are superimposed. Said locking system 400 is different from and independent of the locking of the valves 108, 208 on the stationary bodies 202, 102, i.e. different from the first and second locking means described in more detail hereinafter. Indeed, the first and second locking means do not enable the first and second connectors 100, 200 to be locked, or secured. The locking system 400 therefore ensures that the connectors 100, 200 are maintained in place once they are connected. It will be noted that the locking system 400 can be configured to be engaged after the valves 108, 208 are locked onto the stationary bodies 202, 102 when the first and the second connectors 100, 200 are connected to each other. The locking system 400 is for example a ball type, screw, cam, bayonet, pin, or any magnetic or electromagnetic type.

Moreover, the connection device 1 can comprise indexing means enabling a correct relative positioning of the first and second connectors 100, 200 with respect to each other before connection, such as a rod 700 and a corresponding opening 702 for example, and/or interlocking means 703, 704. The said indexing means are advantageously external to the stationary bodies 102, 202 and to the valves 108, 208 of the first and second connectors 100, 200, i.e. not forming part thereof.

Furthermore, the connection device 1 comprises first locking means configured to lock the valve 108 of the first connector 100 onto the stationary body 202 of the second connector 200 during engagement of the first connector 100 and the second connector 200, and second locking means configured to lock the stationary body 102 of the first connector 100 onto the valve 208 of the second connector 200 during the engagement of the first connector 100 and the second connector 200.

In particular, the first locking means and the second locking means are respectively intended to secure the valve 108 in translation to the stationary body 202, and the valve 208 to the stationary body 102.

As can be seen in FIG. 1, the first locking means comprise for example a groove 132 and one or more locking members 232 that are radially movable relative to the axis of translation of the valves 108, 208 and intended to engage the groove 132. The groove 132 in this case is arranged on an outer lateral wall of the stub portion 122 of the valve 108, and the locking members 232 are balls for example, movable in a radial bore made through one side wall of the recess 220.

The second locking means can comprise a groove 133 and one or more locking members 234, for example balls, radially movable relative to the axis of translation of the valves 108, 208 and intended to engage the groove 133. The groove 133 in this case is arranged on a side wall defining the recess 126, and the locking members 234 are movable in a radial bore arranged through a lateral wall of the stub portion 226.

It should be noted that advantageously the connection device 1 does not have means of locking the valves 108, 208 in the closing position thereof. In other words, the valves 108, 208 are left free in the closing position, and are not blocked in the closing position. The valves 108, 208 can simply be returned by return means, in this case corresponding to the springs 110, 210. Indeed, the pressures are equalized at the valves 108, 208, due to the arrangement thereof and to that of the sealing members 141, 241 supported by the same part. There is therefore no need to provide for locking of the valves 108, 208 in the closing position.

Moreover, the connection device 1 can advantageously comprise locking means that are configured to maintain the valve 108 locked to the stationary body 202 and the stationary body 102 locked to the valve 208 for as long as the valves 108, 208 are out of their closing position, i.e. during the connection and disconnection of the connectors 100, 200.

The blocking means in this case comprise a sleeve 134, preferably made integral with the stationary body 102, having an inner wall 136. The said sleeve 134 extends around the conduit 104 defined by the stationary body 102 and defines with the stationary body 102 a space inside which the valve 108 is intended to move between the closing position and the release position.

Figure 6:
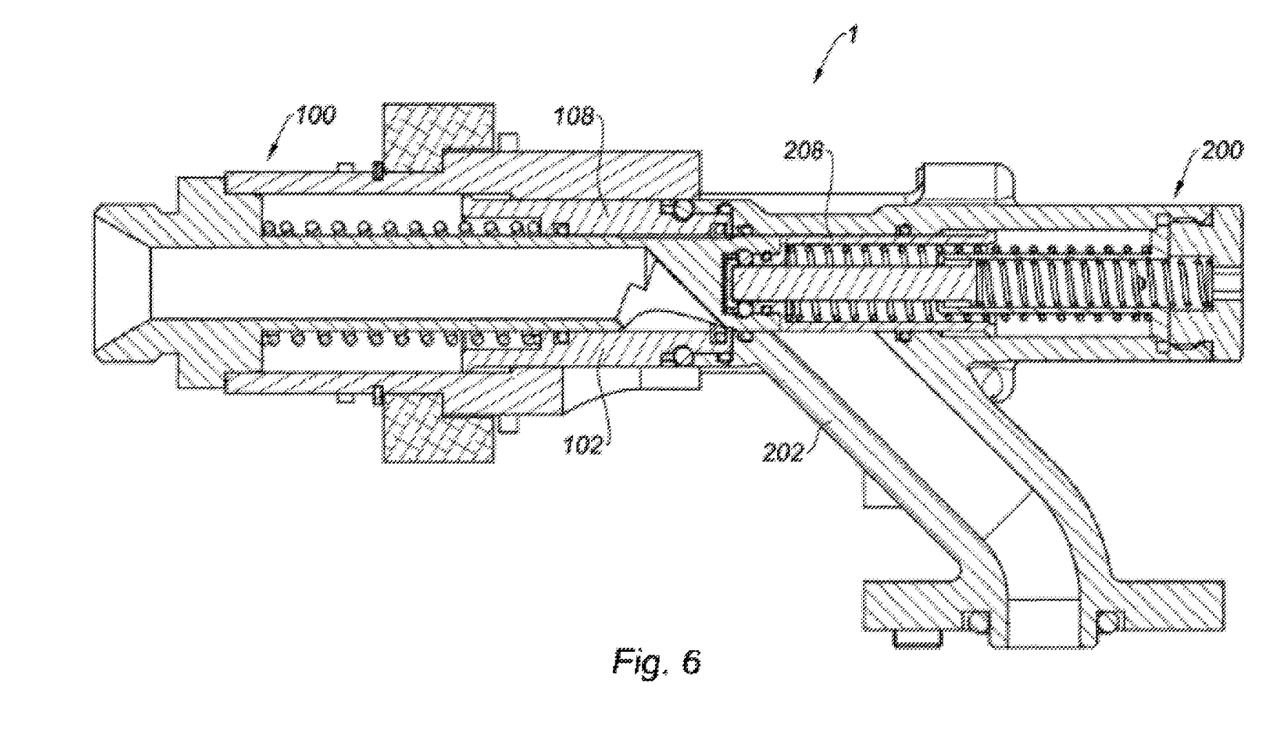

The inner wall 136 is intended to maintain the locking member or members 232 inside the groove 132 during the movement of the valve 108 between the closing position and the release position, as can be seen for example in FIG. 6.

Indeed, the valve 108 is movable between a lateral wall 140 of the stationary body 102 and the inner wall 136 of the sleeve 134 and guided by the said walls.

To facilitate the engagement of the locking members 232 in the groove 132, the inner wall 136 can have a flared shape at the end of the sleeve 136. In particular, the sleeve 136 can have one beveled end 137.

Furthermore, the inner wall 136 can have a shoulder 138 against which a radial protrusion 139 of the valve 108 is intended to press, in order to stop the valve 108 in the closing position.

As regards the second connector 200, the blocking means can comprise a push member 236, movable relative to the valve 208, between a blocking position (FIG. 7 for example) in which the push member enables the locking members 234 to be maintained protruding from an external lateral face of the stub portion 226 and therefore inside the groove 133, and a unblocking position (FIG. 1) in which the push member 236 enables movement of the locking members 234 radially towards the interior of the stub portion 226 and therefore outside the groove 133.

The push member 236 is for example a substantially cylindrical rod. The push member 236 has an exterior lateral wall 238 intended to press against the locking members 234 to maintain them in the groove 133, as can be seen in FIGS. 4 to 7.

Figure 3:
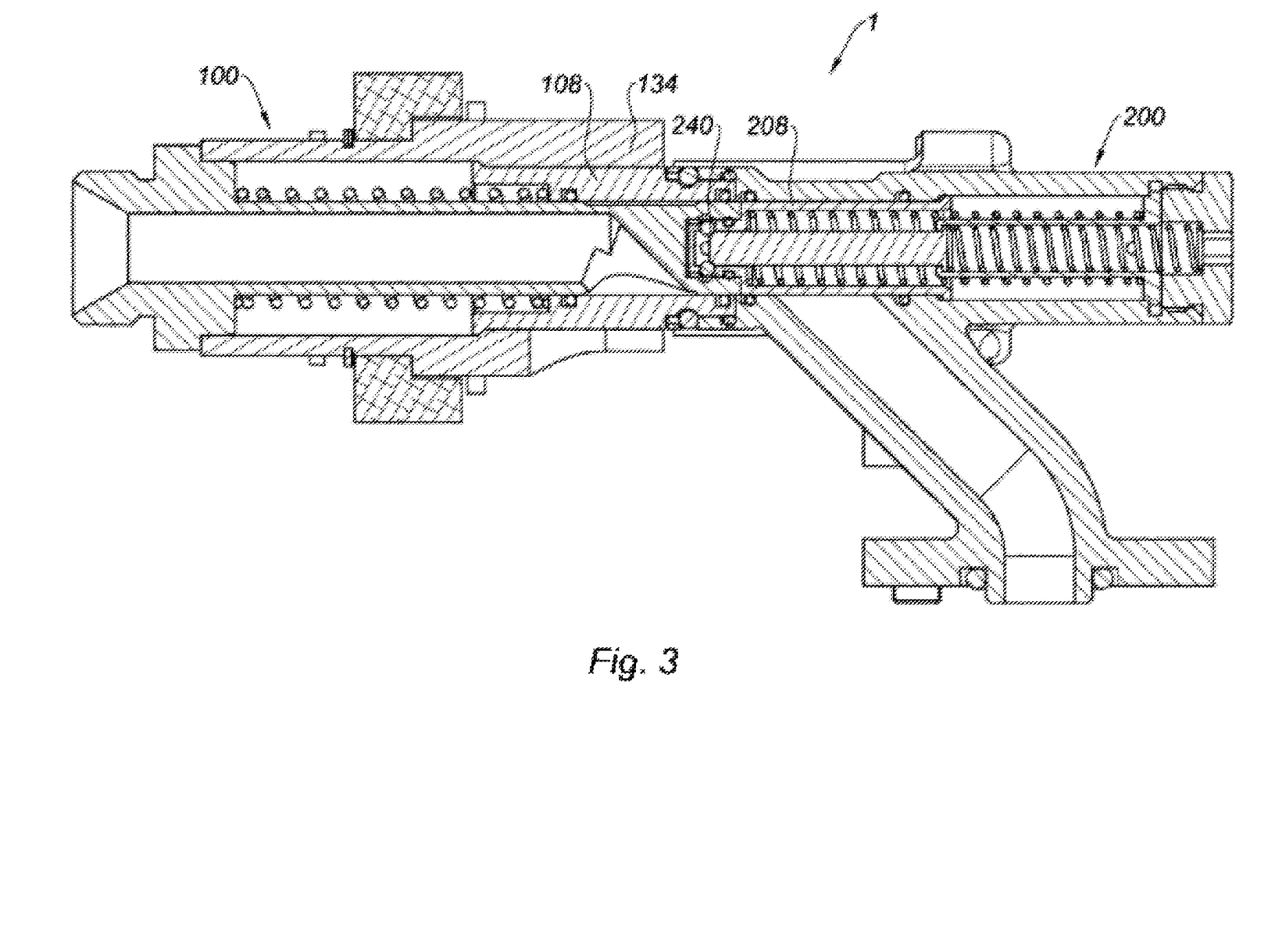
FIGS. 3 to 6 are cross-sectional side views of a connection device according to one embodiment of the invention, illustrating different steps of connection of the first connector and the second connector.

To facilitate the engagement of the locking members 234 in the groove 133, the end of the push member 236 can have a tapered transverse cross-section, and for example a bevel 240 (FIG. 3).

The push member 236 in this case is movable in translation along an axis parallel to or coincident with the axis of translation of the valve 208 relative to the stationary body 202.

More specifically, the valve 208 has a hollow shape and the push member 236 is movable inside the valve 208.

The stub portion 226 defines an internal recess 242 (FIG. 2) into which one end of the radial bore(s) opens, and inside which the locking members 234 are disposed. The push member 236 is movable between the blocking and unblocking positions inside the said internal recess 242, one lateral wall 242 of which, pressed against the external lateral wall 238, can serve as guide.

Moreover, the member 236 is movable in translation relative to a sleeve 246, substantially cylindrical, integral with the stationary body 202 and extending parallel to the axis of translation of the valve 208 between a deployed position (FIG. 1) in which the push member 236 extends in this case as far as possible outside the sleeve 246, and a retracted position (FIG. 7) in which the push member 236 extends as far as possible inside the sleeve 246. The sleeve 246 serves as guide in translation of the push member 236.

The spring 210 advantageously extends around the sleeve 246, the push member 236, and particularly inside the valve 208.

The member 236 can have a shoulder 248 (FIG. 5), in this case arranged at one end of the push member 236 opposite to the one engaged in the internal recess 242, intended to press against a flange 250, in this case disposed at one end of the sleeve 246, when the push member 236 is in the deployed position. The flange 250 in this case defines a through-opening enabling the push member 236 to extend through the sleeve 246.

Return means, such as a spring 237 extending particularly in the sleeve 246, can be provided to return the push member 236 to the deployed position.

The end of the push member 136, engaged in the internal recess 242, can have a stop face 252 (FIG. 2) against which a bottom 254 of the internal recess 242 is intended to press when the valve 208 is moved from the closing position to the release position. Thus, by pressing of the bottom 254 against the stop face 252, the valve 208, by being moved from the closing position to the release position, moves the push member 236 from the deployed position to the retracted position.

Advantageously, it will be noted that the connection openings 106, 206 extend parallel to the axis of translation of the valves 108, 208. In other words, a normal to the connection openings 106, 206 is substantially perpendicular to the axis of translation of the valves 108, 208.

The connection opening 106 of the first connector 100 is made through the lateral wall 140 of the substantially cylindrical stationary body 102.

The connection opening 206 of the second connector 200 is made through a lateral wall 256 (FIG. 2) of a guide portion 258 of the stationary body 202. The valve 208 is intended to slide inside the said guide portion 258. The guide portion 258 is substantially cylindrical and the valve 208 is a movable plug inside the said cylindrical portion.

Furthermore, the connection opening 206 is arranged in this case at the end of a fluid circulation portion 260 from the stationary body 202. The fluid circulation portion 260 defines the conduit 204. The connection opening 206 is at the intersection of the guide portion 258 and the circulation portion 260.

It will be noted that the lateral wall 256 has, on an inner face, a shoulder 262 against which a radial projection 264 of the valve 208 is intended to press to stop the valve in the closing position.

The connection device 1 comprises first sealing means configured to prevent a fluid leakage between the stationary body 102 and the valve 108, and between the stationary body 202 and the valve 208, through the connection openings 106, 206, when the valves 108, 208 are in the closing position.

The first sealing means comprise in this case, for each of the connectors 100, 200, a pair of sealing members 141, 241, for example O-rings, disposed on either side of the connection opening 106, 206 when the valve 108, 208 is in the closing position.

Each pair of sealing members 141, 241 is advantageously supported by a single part of the first connector 100 or the second connector 200. The said part can be, for example, the valve 108, 208 or the stationary body 102, 202.

According to one advantageous possibility, the pair of sealing members 141, 241 of one of the connectors 100, 200 is supported by the valve 108, 208 of the said connector 100, 200, while the pair of sealing members 141, 241 of the other connector 100, 200 is supported by the stationary body 102, 202 of the said other connector 100, 200. Thus, the sealing members 141, 241 supported by the stationary body 102, 202 are immobile relative to the connection opening 106, 206 of the said stationary body 102, 202, and they also ensure the sealing of the connection once the first and second connectors 100, 200 are connected.

In this case, the pair of sealing members 141 of the first connector 100 is supported by the valve 108, while the pair of sealing members 241 is supported by the stationary body 202.

Figure 2:
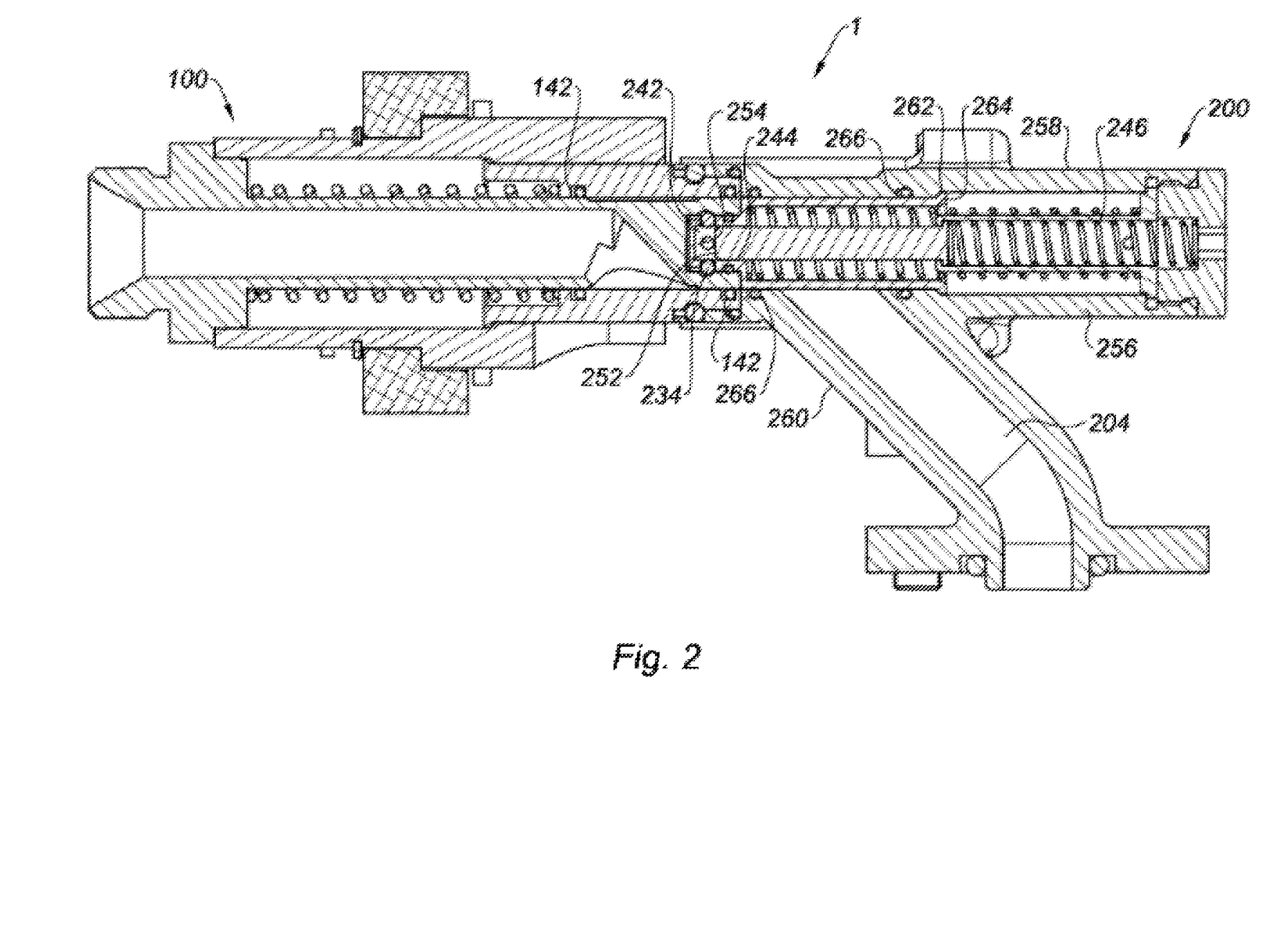
FIG. 2 is a cross-sectional side view of a connection device according to one embodiment of the invention, in which the first connector and the second connector are pressed against each other, but disconnected.

The valve 108 has two grooves 142 on an inner face, each groove 142 receiving one of the sealing members 141 (FIG. 2).

The stationary body 202 has two grooves 266 on an inner face of the lateral wall 256, each groove 266 receiving one of the two sealing members 241.

It will be noted that the pairs of sealing members 141, 241 are arranged outside the conduits 104, 204, outside the fluid passage section defined by the conduits 104, 204 and are therefore not exposed to the fluid flows circulating through the said conduits 104, 204.

In other words, the grooves 142, 266 do not open directly into the conduits 104, 204; in the closing as well as release positions of the valves 108, 208, the grooves 142, 266 open onto an interposition element, which can be the lateral wall 140 of the stationary body 102 for the pair of sealing members 141, and a lateral wall of the valve 208 or the lateral wall 140 of the stationary body 102 for the pair of sealing members 241.

Thus, the members 141, 241 do not hinder the flow of fluid through the connectors 100, 200. Furthermore, this prevents any risk of pullout resulting in loss of seal in the event of high fluid flow rate.

It will be noted that the pairs of sealing members 141, 241 extend around the axis of translation of the respective valves 108, 208, preferably in a plane substantially perpendicular to the said axis of translation.

The connection device 1 also comprises second sealing means configured to prevent leakage of fluid between the stationary body 102 and the valve 208, and between the stationary body 202 and the valve 108 when the stationary bodies 102, 202 are locked respectively to the valves 208, 108 during the connection or disconnection operation.

The second sealing means prevent fluid leaks at the interface of valve 108/stationary body 202 and valve 208/stationary body 102. During the translation of the valves 108, 208 to the position of release (connection) or closing (disconnection), the said interfaces pass in front of the connection openings 106, 206 and are therefore exposed to the fluid present in the conduits 104, 204.

In particular, the second sealing means (FIG. 4) comprise a first sealing member 268 intended to prevent leakage of fluid between the valve 108 and the stationary body 202, and a second sealing member 270 intended to prevent leakage of fluid between the valve 208 and the stationary body 102. The first and second sealing members 268, 270 are O-rings, for example.

According to the example of FIGS. 1 to 7, the first sealing member 268 is placed inside a groove made on a lateral wall of the recess 220, and the second sealing member 270 is placed inside a groove made on an outer face of the lateral wall of the stub portion 226.

The first sealing member 268 and the second sealing member 270 extend out of the conduits 104, 204.

The first sealing member 268 and the second sealing member 270 extend in a plane substantially perpendicular to the axis of translation of the valves 108, 208.

The different steps of a method of connecting the first connector 100 and the second connector 200 are described in more detail hereinafter, starting with an initial situation (FIG. 1) in which the first connector 100 and the second connector 200 are disconnected.

The first and second connectors 100, 200 are indexed, positioned correctly relative to each other by indexing means, then placed in contact (FIG. 2). The bearing faces 114, 214 and the stop faces 112, 212 are placed in contact. According to the example of FIG. 2, the stub portion 122 is inserted into the recess 220, the stub portion 226 is inserted into the recess 126, the shoulder 120 is pressed against the upper edge 222, the end wall 124 is pressed against the shoulder 224, the upper edge 130 is pressed against the shoulder 228.

The locking members 232, 234 can be engaged in the respective grooves 132, 133, without, however, locking thereto.

The user then pushes the first connector 100 and the second connector 200 against each other. The stationary body 202 of the second connector presses and moves the valve 108 of the first connector from the closing position to the release position, against the action of the spring 110, while the stationary body 102 of the first connector 100 presses and moves the valve 208 from the closing position to the release position against the action of the spring 210 (FIGS. 3 to 7).

During the movement of the valve 208 to the release position, the push member 236 penetrates the internal recess 242, and the bevel 240 pushes, if necessary, the locking members 234 inside the groove 133 (FIG. 3).

Figure 4:
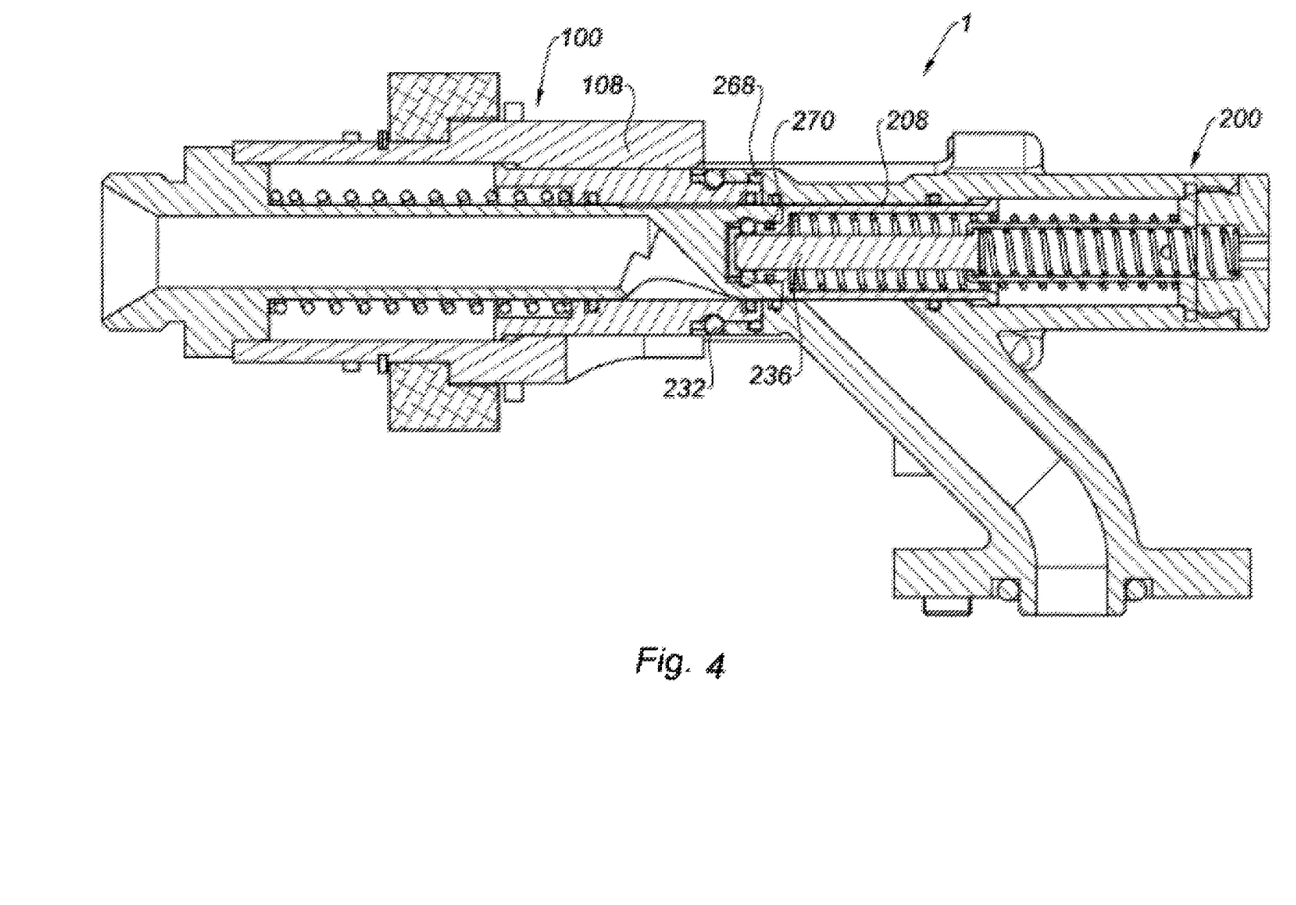

The outer lateral wall 238 comes into contact with the locking members 234 and blocks them in the groove 133: the valve 208 is locked to the stationary body 102 (FIG. 4).

Figure 5:
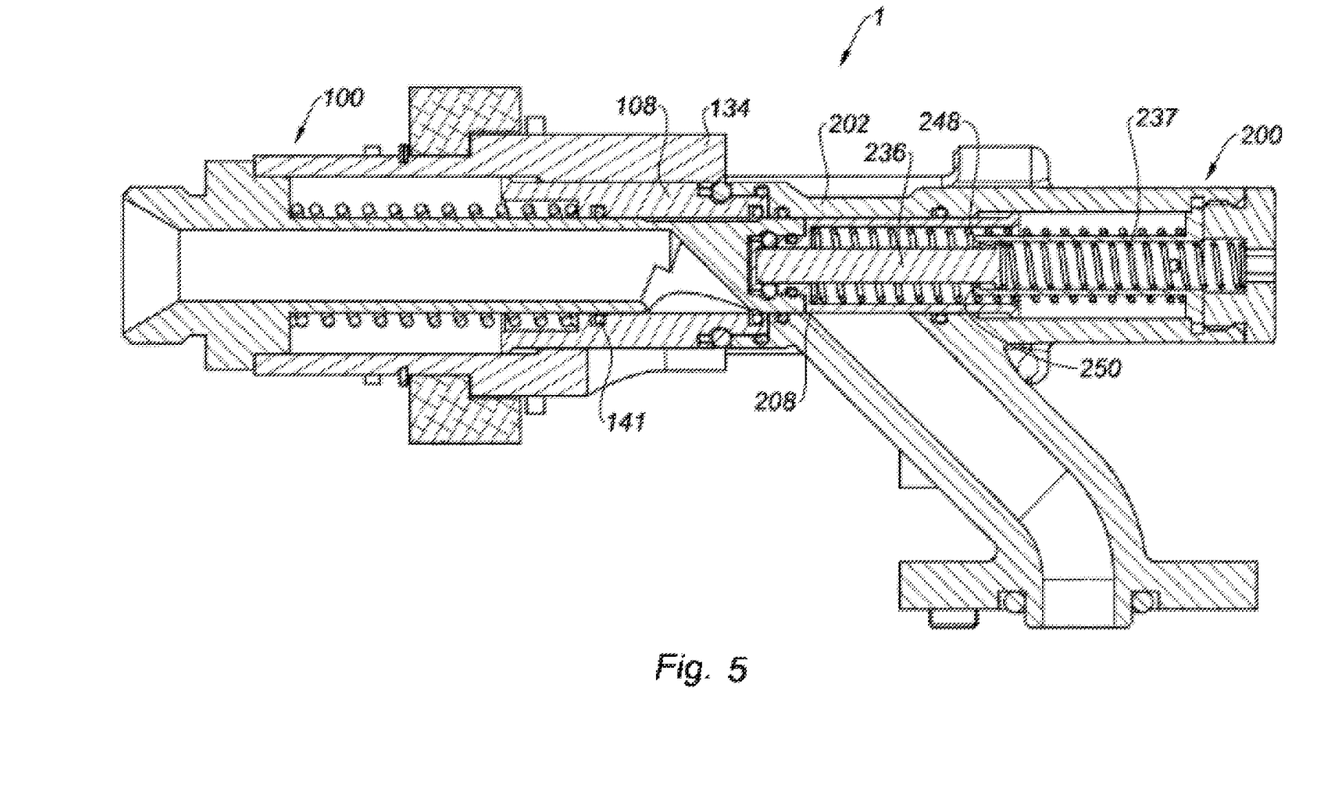

If necessary, the bevel 137 moves the locking members 232 inside the groove 132 (FIG. 5). Moreover, by pressing against the stop face 252, the bottom 254 pushes and moves the push member 236 from the deployed position to the retracted position. The member 236, however, remains in blocking position, inside the internal recess 242, under the action of the spring 237.

The inner wall 136 of the sleeve 134 then presses against the locking members 132 and maintains them engaged in the groove 132: the valve 108 is then locked onto the stationary body 202 (FIG. 6).

Figure 7:
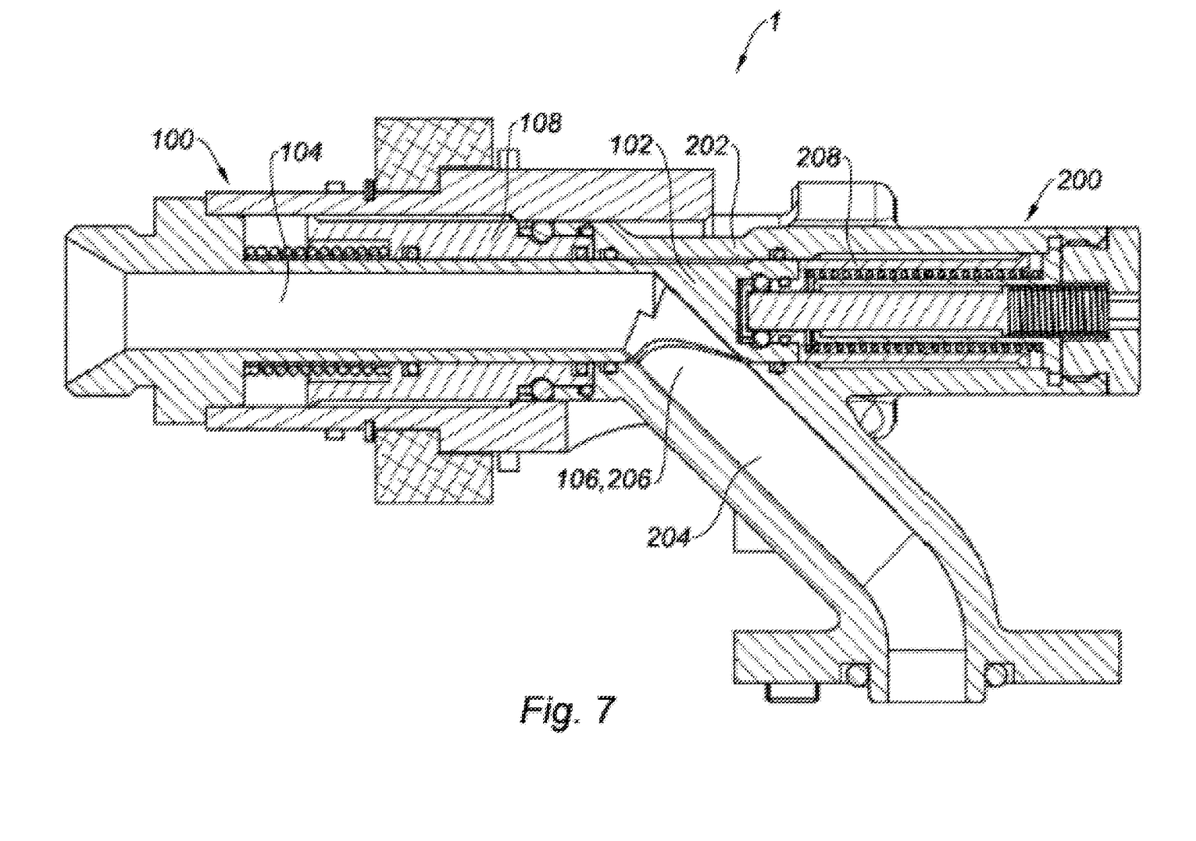
FIG. 7 is a cross-sectional side view of a connection device according to one embodiment of the invention, the first connector and the second connector being locked.

The user continues to move the first connector 100 and the second connector 200 against each other, until the connection openings 106, 206 are superimposed (FIG. 7). To that end, the connection device 1 can comprise a stop (not shown) to stop the engagement of the first connector 100 and the second connector 200 when the connection openings 106, 206 are facing each other. Furthermore, the first and second connectors 100, 200 can be maintained in the said connected state by the locking system 400.

The method provides that the step of locking the valves 108, 208 respectively onto the stationary bodies 202, 102 occurs before the step of locking the first and second connectors 100, 200 directly to each other by means of the locking system 400, so that during the connection process the fluid under pressure does not move the valves 108, 208 in an uncontrolled manner.

During the disconnection, the locking of the valve 108 to the stationary body 202 and of the valve 208 to the stationary body 102 guarantees the return of the valves 108, 208 to the closing position, the said valves 108, 208 being pulled by the stationary part 102, 202 to which they are locked.

Figure 8:
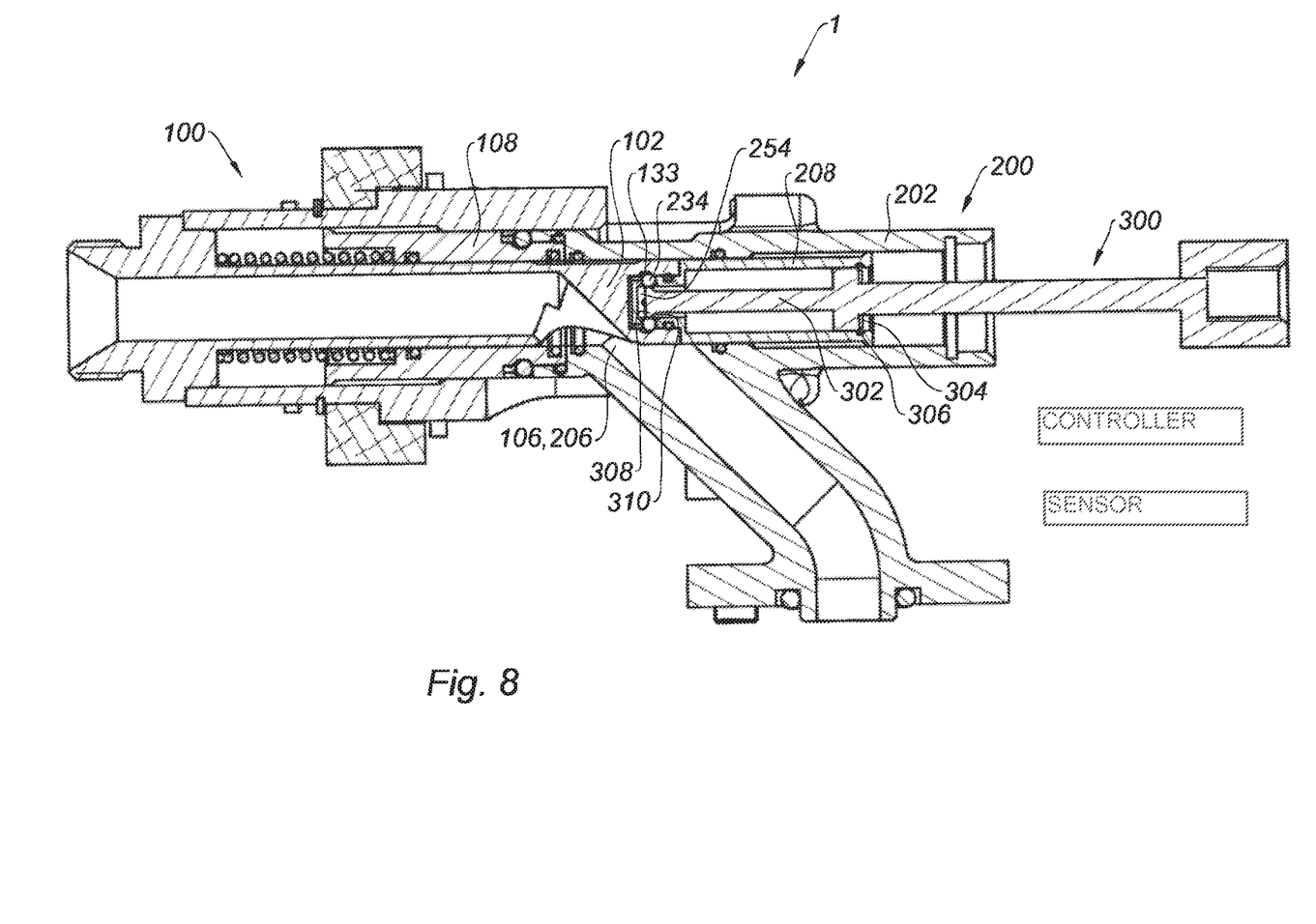
FIG. 8 is a cross-sectional side view of a connection device according to one embodiment of the invention.

As illustrated in FIG. 8, the connection device 1 advantageously comprises means of regulating the flow of fluid intended to circulate through the first and second connectors 100, 200.

The means of regulating the flow of fluid can comprise at least one drive member 300, for example an actuator, configured to modify the relative position of one of the valves 108, 208 relative to the connection openings 106, 206.

Thus, the drive member 300 makes it possible to cause one of the valves 108, 208 to adopt an intermediate position (FIG. 8), between the closing position and the release position, in which the valve 108, 208 extends partly through the connection openings 106, 206, resulting in reducing the cross-section of the passage of the fluid through the connection openings 106, 206 relative to the release position.

The drive member 300 can be configured to directly move the first and second connector 100, 200 relative to each other, i.e. to vary the distance between the first and second connectors 100, 200, by moving them closer to each other or farther away from each other. Indeed, varying the distance between the first and second connector 100, 200 makes it possible to modify the position of the valves 108, 208 relative to the connection openings 106, 206, and therefore to vary the flow rate of fluid passing through the connection openings 106, 206. This solution advantageously makes it possible to use a single drive member 300 for first and second connectors 100, 200 comprising a plurality of stationary bodies 102, 202, conduits 104, 204, valves 108, 208, connection openings 106, 206, etc.

As can be seen in FIG. 8, alternatively the drive member 300 can be configured to directly move one of the two valves 108, 208 between the closing, intermediate and release positions, preferably the valve 108, 208 that extends inside the respective stationary body 102, 202, such as the valve 208 in this case, because access is easier. Advantageously this makes it possible to control each valve 208 independently of the other valves, which can include the first or second connector 100, 200.

The drive member 300 in this case is an actuator comprising a rod 302 extending into the stationary body 202 and into the valve 208. The rod of the actuator in this case acts as a push member 236. Moreover, the rod of the actuator comprises a thrust face enabling the valve 208 to be returned to the closing position.

Furthermore, the flow regulation means can comprise a sensor (not shown) intended to measure a parameter of the fluid circulating in one or both conduits 104, 204, and a control unit (not shown) intended to control a modification of the flow of fluid based on the value of the measured parameter. This makes it possible to achieve a servo-control of the fluid flow rate. The control unit can be configured to control the drive member 300.

For example, for a coolant type fluid, the sensor can be a temperature sensor intended to measure the temperature of the fluid circulating in one or both conduits 104, 204. If the measured temperature is less than a predetermined setpoint temperature, then the control unit can control a reduction of the fluid flow rate passing through the connection openings 106, 206 in order to reduce consumption. This enables efficient cooling to be maintained with reduced consumption.

It will be noted that the connection device 1 can advantageously comprise means of automatic connection of the first and second connectors 100, 200. The automatic connection means are configured to automatically bring the first and second connectors 100, 200 together in order to achieve the connection once the said connection has been manually initiated by an operator. The said connection means can comprise a drive member, which is the drive member 300 making it possible to modify the relative position of one of the valves 108, 208 relative to the connection openings 106, 206.

Thus, again according to the example of FIG. 8, the drive member 300 is configured to achieve an automatic connection of the first and second connectors 100, 200 after the said connection has been manually initiated.

To that end, the rod 302 of the actuator comprises a stop face 304, such as a shoulder, intended to press directly against the valve 208 or against an element integral with the valve 208, such as a snap ring 306, in order to move the valve 208 to the release position. Moreover, the rod 302 of the actuator can have a radial protrusion 308 making it possible to cause the movement of the locking members 234 in the groove 133 in order to lock the valve 208 to the stationary body 102 (i.e. having the same role as the end of the push member 236 and the outer lateral wall 238). Furthermore, the radial protrusion 308 has a sloping tension section 310 which, by pressing against the locking members 234 contained in the groove 133, enables the stationary body 102 to be pulled. Simultaneously, the stop face 306 is pressed against the valve 208 and pulls it towards the release position.

The connection takes place in the following manner. Initially the radial protrusion 308 is positioned between the locking members 234 and the bottom wall 254; the rod 302 of the actuator can be pressed against the said bottom wall 254. An operator initiates the connection by manually placing the first and second connectors 100, 200 in contact as previously described. Starting from the moment when the groove 133 faces the locking members 234, for example when the stationary body 102 presses against the valve 208, the automatic connection can be initiated. The rod 302 of the actuator is retracted, so that the radial protrusion 308 pushes the locking members 234 into the groove 133 and thus locks the valve 208 and the stationary body 102. By continuing the movement, the sloping section 310 of the radial protrusion pushes the locking members 234 against one wall of the groove 133, so that the stationary body 102 is pulled, drawn by the rod 302 of the actuator inside the second connector 200. Since the rod 302 of the actuator also presses against the valve 208 by means of the stop face 304, the said valve is simultaneously moved to the release position.

To disconnect the first and second connector 100, 200, the rod 302 of the actuator is simply pushed against the valve 208, particularly against the bottom wall 254, in order to move the valve 208 to the closing position. This done, the radial protrusion 308 no longer holds the locking members 234 in the groove 133.

The invention also concerns the first connector 100, and the second connector 200, intended for the implementation of the connection device 1.

In particular, the valve 108 of the first connector comprises a first locking element, which can be the groove 132 or a locking member movable in a radial bore intended to engage a groove of the stationary body 202 of the second connector 200, and the stationary body 102 of the first connector 100 comprises a second locking element, which can be the groove 133 or a locking member movable in a radial bore intended to engage a groove of the valve 208 [of the] second connector 200. The first locking element is intended to cooperate by shape complementarity with a first locking element of the stationary body 202 of the second connector 200, and the second locking element is intended to cooperate by shape complementarity with a second locking element of the valve 208 of the second connector 200.

The stationary body 202 of the second connector 200 also comprises a first locking element, complementary of the first locking element of the valve 108, which can be the locking member(s) 232 movable in a radial bore or a groove, and the valve 208 comprises a second locking element, complementary to the second locking element of the stationary body 102, which can be the locking member(s) 234 or a groove.

Furthermore, the first and second connectors 100, 200 according to the invention can comprise all or part of the characteristics of the connectors 100, 200 of the connection device 1 previously described.

Figure 10:
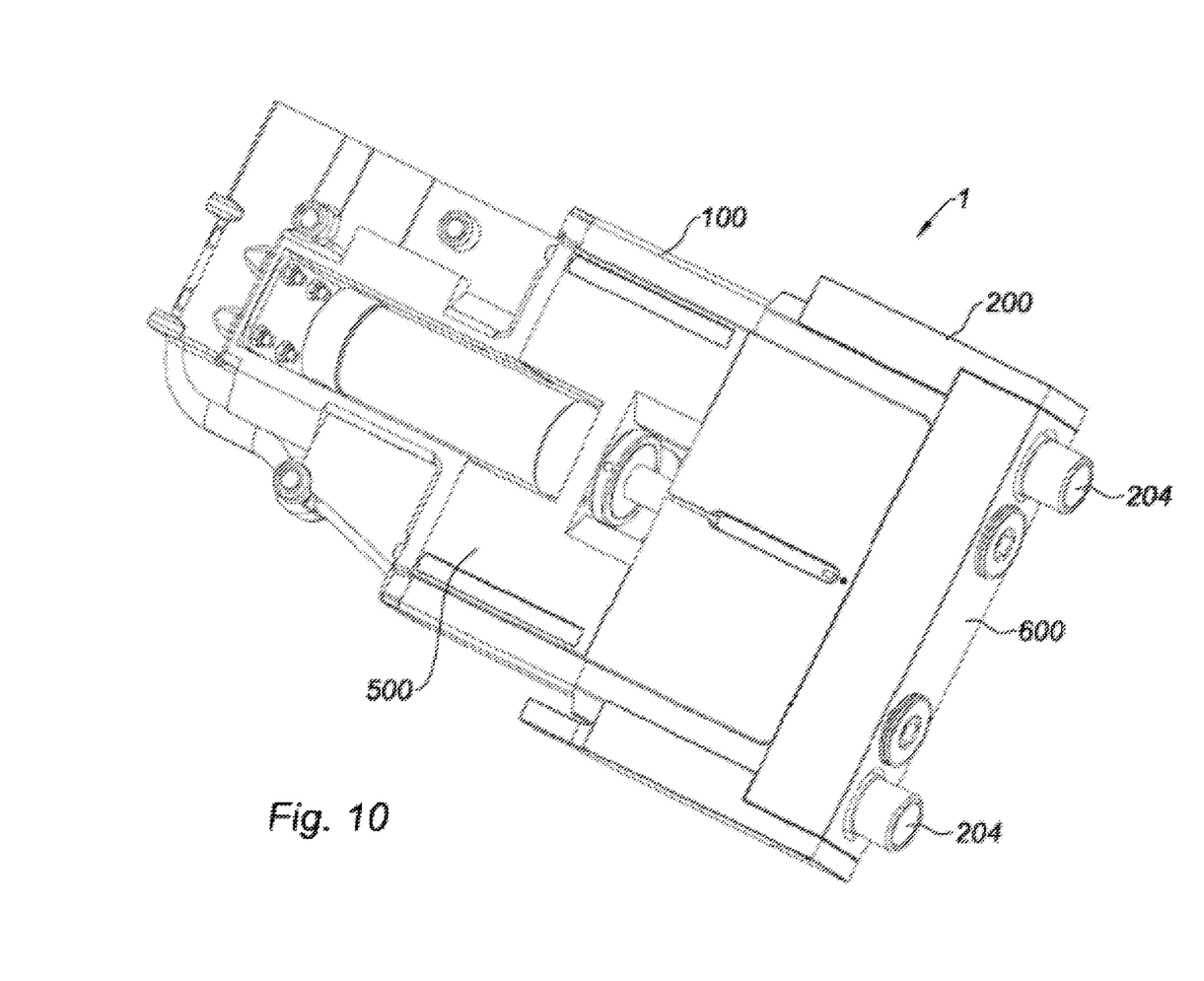

As illustrated in FIGS. 9 and 10, it will be noted that each connector 100, 200 could include a plurality of stationary bodies 102, 202, conduits 104, 204, valves 108, 208, connection openings 106, 206, first locking and sealing means, second locking and sealing means, blocking means, etc., the connection of the connectors 100, 200 making it possible to establish a fluid communication between the plurality of conduits 104 of the first connector 100 and the plurality of conduits 204 of the second connector 200, in the same way as previously described. The stationary bodies 102 are supported by a first support 500 that is integral therewith. Similarly, the stationary bodies 202 are supported by a second support 600 that is integral therewith. As appropriate, the connection device 1 comprises a single locking system 400, which is therefore common to all the stationary bodies 102, 202, conduits 104, 204, etc. of the connection device 1. The indexing means can be arranged at the supports 500, 600. The indexing means are also common to all the stationary bodies 102, 202, conduits 104, 204, etc. of the connection device 1.

Of course, the invention is in no way limited to the embodiment described above, said embodiment having been provided solely by way of example. Modifications are possible, particularly from the point of view of formation of the various elements or by substitution of technical equivalents, without going beyond the domain of protection of the invention.

The invention claimed is:

1. A connection device comprising a first connector and a second connector, the first connector and the second connector comprising a stationary body, the stationary body defining a fluid circulation conduit through the stationary body that opens into a connection opening, and a valve movable relative to the stationary body between a closing position, in which the valve closes the connection opening, and a release position, in which the valve opens a passage through the connection opening, wherein the connection device further comprises first locking means configured to lock the movable valve of the first connector to the stationary body of the second connector, and second locking means configured to lock the stationary body of the first connector to the movable valve of the second connector; and wherein the fluid circulation conduits of the first and second connectors are of constant cross-sectional area such that flow through the connection device is free of obstacles that can hinder flow of fluid through the connection device.

2. The connection device according to claim 1, wherein the connection device comprises locking means configured to maintain the movable valve of the first connector and the stationary part of the second connector in a locked position, as well as the stationary part of the first connector and the movable valve of the second connector, while the valves) are not in the closing position thereof.

3. The connection device according to claim 1, wherein the valves are movable in translation relative to the stationary bodies along an axis of translation substantially perpendicular to a normal to the connection openings.

4. The connection device according to claim 1, wherein at least one of the connectors between the first connector and the second connector comprises two sealing members intended to prevent leakage of fluid between the stationary body and the valve of the said connector when the valve is in the closing position, both sealing members being supported by the same part of the said connector.

5. The connection device according to claim 1, wherein at least one of the connectors between the first connector and the second connector comprises two sealing members intended to prevent a leak of fluid between the stationary body and the valve of the said connector when the valve is in the closing position, the two sealing members being arranged outside the conduit defined by the stationary body of the said connector.

6. The connection device according to claim 1, wherein the connection device comprises means of regulating the flow rate of fluid intended to circulate through the first and second connectors.

7. The connection device according to claim 1, wherein the connection device comprises a locking system configured to lock the first connector and the second connector once they are connected, the said locking system being different from the first and second locking means.

8. The method of connection of a first connector and a second connector of a connection device according to claim 1, comprising a first locking step enabling the locking of the valve of each connector between the first and second connectors to the stationary body of the other connector of the said first and second connectors, then a second locking step, different from the first locking step, enabling the locking of the first connector to the second connector.

9. A connection device comprising a first connector and a second connector, the first connector and the second connector comprising a stationary body, the stationary body defining a fluid circulation conduit that opens into a connection opening, and a valve movable relative to the stationary body between a closing position, in which the valve closes the connection opening, and a release position, in which the valve opens a passage through the connection opening, wherein the connection device further comprises first locking means configured to lock the movable valve of the first connector to the stationary body of the second connector, and second locking means configured to lock the stationary body of the first connector to the movable valve of the second connector; and wherein the connection device comprises means of automatic connection of the first and second connectors.

10. A connection device comprising a first connector and a second connector, the first connector and the second connector comprising a stationary body, the stationary body defining a fluid circulation conduit that opens into a connection opening, and a valve movable relative to the stationary body between a closing position, in which the valve closes the connection opening, and a release position, in which the valve opens a passage through the connection opening, wherein the connection device further comprises first locking means configured to lock the movable valve of the first connector to the stationary body of the second connector, and second locking means configured to lock the stationary body of the first connector to the movable valve of the second connector; and wherein the first and second connectors comprise return means for returning each valve to the closing position.

* * * * *